March 24, 1964 G. CONSTANTINE, JR 3,126,533

MAGNETIC SWITCHING DEVICE

Original Filed June 30, 1958

INVENTOR
GREGORY CONSTANTINE, JR.

BY Roger S. Smith

ATTORNEY

United States Patent Office 3,126,533

Patented Mar. 24, 1964

3,126,533

MAGNETIC SWITCHING DEVICE

Gregory Constantine, Jr., Arlington, Mass., assignor to International Business Machines Corporation, New York, N.Y., a corporation of New York Continuation of application Ser. No. 745,662, June 30, 1958. This application Dec. 8, 1960, Ser. No. 74,547

10 Claims. (Cl. 340—174)

This invention relates to switching devices and more particularly to an improved magnetic switch.

This application is a continuation of copending application Serial No. 745,662, filed June 30, 1958, now abandoned, by this inventor.

Switching devices capable of controlling a plurality of loads find many uses in the electronics and data processing arts. One example of such use is the control of a magnetic core memory. Data processing machines employ a memory which may be of magnetic core type comprising one or more memory planes each consisting of a plurality of magnetic cores arranged in a matrix of columns and rows. Generally, each plane is provided with separate row windings each inductively coupling a row of cores and separate column windings each inductively coupling a column of cores. If more than one plane is employed, the corresponding row windings and the corresponding column windings of each plane are respectively connected so that a selected row and column winding intersect a group of cores occupying corresponding positions in the memory planes. Excitation of both a selected row and column winding causes the cores at the intersections of these windings to have their magnetic condition changed. Thus, a group of memory cores, corresponding to the bits of a data word, may be selected by applying a drive pulse coincidently to a selected row and column winding. Each plane is also provided with a sense winding inductively coupled to all of the cores in the plane to sense the change in magnetic condition of the selected core in the plane.

Selection of a row winding and column winding may be accomplished by a magnetic switch. One type of magnetic switch is the load sharing type which consists of a plurality of magnetic cores having a plurality of windings inductively coupled thereto in accordance with a predetermined combinatorial code. Each core has an output winding connected to a row or column winding of the memory. Drive means are provided for applying drive pulses coincidently to selected ones of the windings so that a desired one of the cores has its magnetic condition changed inducing a signal in its output winding which is used to drive a selected row or column winding of the memory. This arrangement permits the power from several sources to be combined into a single high powered output signal. Consequently, each source need only furnish a fraction of the power required by the load.

One of the major problems encountered in magnetic switches is that of unwanted signals, termed "noise," generated in the unselected cores when the selected core is being driven. Thus, though the magnetic effect due to the drive currents passing through an unselected core in the same sense is partially cancelled by the magnetic effect due to the drive currents passing through the unselected core in the opposite sense, the net magnetic effect causes the unselected core to be driven a small amount thereby inducing a small undesirable noise signal in the output winding thereof. This spurious output is applied to an unselected winding of the memory and may start to switch an unselected group of memory cores, tending to destroy their stored information or produce incorrect output from the memory. This is especially so during the read time of a memory cycle when data is being sensed on the sense wires of memory. Furthermore, the drivers must furnish the additional power which goes into these spurious signals and does no useful work.

Accordingly, an object of the present invention is to provide a new and improved magnetic switch.

Another object of the invention is to provide a novel magnetic switch which minimizes spurious outputs.

Still another object of the invention is to reduce noise pickup in a magnetic core memory.

A further object of the invention is to provide a novel load sharing magnetic switch which reduces the required driver power.

A still further object of the invention is to provide a novel magnetic switch design which may be expanded without introducing additional spurious outputs.

In accordance with the present invention a magnetic switch is provided comprising a plurality of magnetic cores having a plurality of pairs of windings inductively coupled to each core in a different manner. Driver means are provided to apply drive currents coincidently to selected ones of the windings for selecting one of the cores in accordance with a predetermined combinatorial code. The selected windings are wound on the selected core in such a manner that the magnetic effect on the selected core dure to the currents in the selected windings is additive to produce excitation of the selected core while the selected windings are wound on the remaining unselected cores except one in such a manner that the magnetic effect on these remaining unselected cores due to the currents in the selected windings is cancelled to produce no excitation thereof and the selected windings are wound on the one remaining unselected core in a complementary manner to that on the selected core so that the magnetic effect due to the currents in the selected windings is additive to produce excitation in the opposite sense to that produced in the selected core.

Other objects of the invention will be pointed out in the following description and claims illustrated in the accompanying drawings, which disclose, by way of example, the principle of the invention and the best mode, which has been contemplated, of applying that principle.

Figures 1, 2, 3:
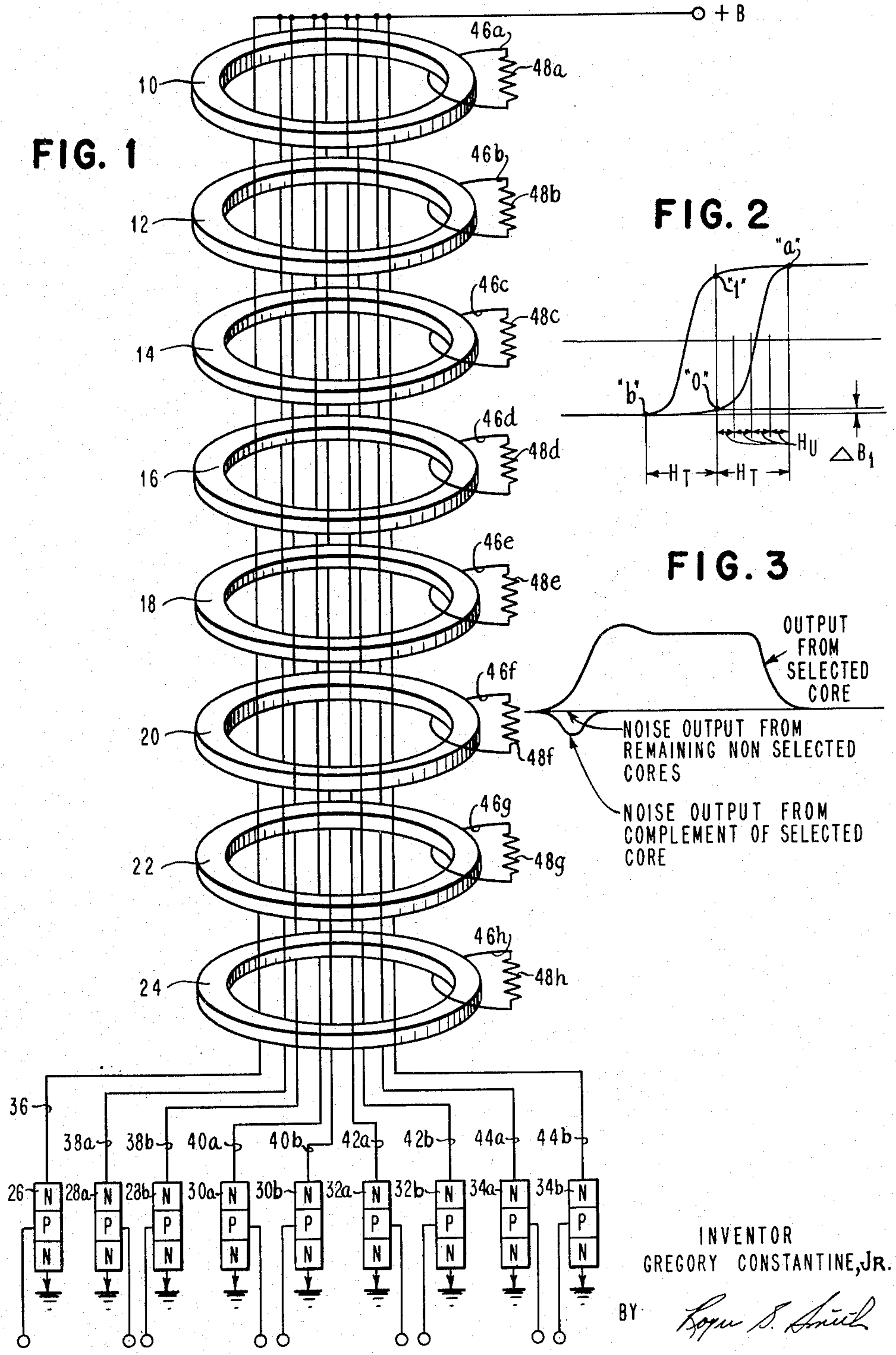
FIGURE 1 is a schematic drawing of a magnetic switch embodying the present invention.
FIGURE 2 is a hysteresis curve which is illustrated as an aid in understanding the embodiment in FIGURE 1.
FIGURE 3 is a waveshape diagram of the outputs obtained from the magnetic switch shown in FIGURE 1.

Referring now to FIGURE 1, there is shown a schematic diagram of one embodiment of the present invention. It comprises a magnetic switch which includes eight magnetic cores 10, 12, 14, 16, 18, 20, 22 and 24 which may be toroidal in shape though other suitable shapes may be used. A single write input winding 36 passes serially through the eight cores to a source +B and four pairs of read input windings 38, 40, 42 and 44 are serially wound, in a different pattern, through the eight cores to a source +B, with the windings of each pair passing in opposite sense through each core. Each core has an output winding 46 which is connected to a row or column winding of the memory represented by the resistor load 48. An NPN transistor driver 26 is connected to the write input winding and four pairs of NPN transistor drivers 28, 30, 32 and 34 are respectively connected to the four pairs of read input windings 38, 40, 42 and 44. Though NPN drivers are shown, it will be understood that other suitable drivers can be used equally as well without departing from the scope of the present invention. When a positive signal is applied to the base of the NPN transistor driver, it is rendered conductive to apply a drive current pulse to the associated winding passing through all of the cores.

Referring now to FIGURE 2, there is shown a typical hysteresis loop for a magnetic core. Magnetic cores possess two stable or remanent states of magnetism which are opposite in sense and, consequently, a magnetic core may operate as a binary element with one remanent state representing the binary digit 1 and the opposite remanent state representing the binary digit 0. The application of a drive current pulse to a wire passing through a magnetic core causes the core to follow the hysteresis loop as a function of the direction and magnitude of the current. The value of the magnitude of current necessary to generate a magnetomotive force sufficient to change the state of the core may be referred to as the threshold value. If the magnitude of the applied drive current pulse has a value which is less than the threshold value, then, the core experiences some magnetic excursion on the hysteresis loop but when the current is removed the core will return to essentially the same remanent state at which it started. On the other hand, if the magnitude of the drive current pulse has a value which is greater than the threshold value and the current is applied in the proper direction, then, the core changes from one remanent state to the other.

Considerably unipolar drive current pulses, the sense of a winding may be defined as the direction in which it passes through the core. Accordingly, a winding in the "1" sense may arbitrarily be designated as passing over and under a core so that a unipolar drive current pulse applied thereto causes a magnetomotive force to be generated which tends to drive the core towards magnetic saturation in the 1 state. A winding in the "0" sense may be designated as passing under and over a core so that a unipolar drive current pulse applied thereto causes a magnetomotive force to be generated which tends to drive the core towards magnetic saturation in the 0 state. Thus, considering a core in the 0 state and a winding passing therethrough in the "1" sense, then, if a unipolar drive current pulse is applied to the winding, the magnitude of which has a value greater than the threshold value, the core follows the hysteresis loop to the saturation point *a* and when the drive current pulse is terminated the core comes to rest in the 1 state. Likewise, considering the core in the 1 state and a winding passing therethrough in the "0" sense, then, if a unipolar drive current pulse is applied to the winding, the magnitude of which has a value greater than the threshold value, the core follows the hysteresis loop to the saturation point *b* and when the drive current pulse is terminated the core comes to rest in the 0 state. The change in flux, when the core switches from the 0 state to the 1 state, induces an output pulse in the output winding of the core which may be used as a read drive pulse for a selected column or row winding of memory. Likewise, the change in flux, when the core switches from the 1 state to the 0 state, induces an output pulse in the output winding of the core equal in magnitude but opposite in polarity to that of the output pulse produced when the core switched from the 0 state to the 1 state and may be used as a write drive pulse for the selected column or row winding of memory.

The principle of load sharing is to combine the magnetomotive forces generated by the currents from several drivers so that the combined magnetomotive force has a value equal to that generated by the current which would otherwise be applied from a single driver. Consequently, each driver need only furnish a fraction of the current required to change the state of the magnetic core. Thus, the unit of current provided by each driver generates magnetomotive force $H_U$ equal to $$\frac{H_T}{N}$$

where $H_T$ is the total magnetomotive force required to drive the core and N is the number of drivers applying drive currents to the core. In applying the principle of load sharing, N windings are inductively coupled to a core in such a sense that by applying drive current pulses coincidently to the N windings, N units of magnetomotive force are combined to drive the core from one state of magnetism to the other. The change in flux, when the core switches from one state to the other, induces an output pulse in the output winding of the core which may be used as a drive pulse for a selected column or row winding of memory.

Referring to FIGURE 1, the present invention contemplates a load sharing magnetic switch consisting of a plurality of cores having N pairs of read windings inductively coupled thereto with a different winding pattern for each core so that a single core may be uniquely selected, in accordance with a read selection pattern, during read time of a memory cycle, to be switched from one state of magnetism to the other. One unselected core of the switch having a read selection pattern which is the complement of the selected core's pattern will receive excitation equal to that received by the selected core but opposite in sense. Hence, this one unselected core is driven along the saturated region of the hysteresis loop causing a small spurious output to be produced in the output winding thereof. The remaining unselected cores of the switch receive zero net excitation so that no spurious outputs are produced in the output windings thereof. A single write winding is inductively coupled to the cores so that, during the write time of a memory cycle, the previously selected core is switched from the other state of magnetism back to the one state.

To accomplish this result, a particular read winding pattern must be developed. The basic pattern is shown in Table I below.

*Table I*

| | |
|---|---|
| 1 | 1 |
| 1 | 0 |
| 0 | 0 |
| 0 | 1 |

where a row represents a single core and column represents a complementary pair of windings. A convention may be adopted whereby a 1 represents the complementary pair of windings passing through the core in a 1—0 sense and a 0 represents the complementary pair of windings passing through the core in a 0—1 sense. The basic pattern may be expanded most conveniently without producing any additional spurious outputs by doubling the size each time and repeating the previous pattern in quadrants, I, II and III and complementing the pattern in quadrant IV. Consequently, the basic pattern may be expanded for an eight output magnetic switch to the following pattern shown in Table II below.

*Table II*

| | | | | | |
|---|---|---|---|---|---|
| | 1 | 1 | 1 | 1 | |
| | 1 | 0 | 1 | 0 | |
| | 0 | 1 | 0 | 1 | |
| II | 0 | 0 | 0 | 0 | I |
| III | 1 | 1 | 0 | 0 | IV |
| | 1 | 0 | 0 | 1 | |
| | 0 | 1 | 1 | 0 | |
| | 0 | 0 | 1 | 1 | |

and further expansions may be accomplished in a similar manner to provide the winding patterns for a 16 output magnetic switch, a 32 output magnetic switch, etc.

Following this expansion the read winding pattern for the eight output magnetic switch of FIGURE 1 is shown in Table III below.

*Table III*

| Core No. | Winding Pattern | Winding Sense | | | | | | | |
|---|---|---|---|---|---|---|---|---|---|
| | | 38a | 38b | 40a | 40b | 42a | 42b | 44a | 44b |
| 10 | 1 1 1 1 | 1 | 0 | 1 | 0 | 1 | 0 | 1 | 0 |
| 12 | 1 0 1 0 | 1 | 0 | 0 | 1 | 1 | 0 | 0 | 1 |
| 14 | 1 1 0 0 | 1 | 0 | 1 | 0 | 0 | 1 | 0 | 1 |
| 16 | 1 0 0 1 | 1 | 0 | 0 | 1 | 0 | 1 | 1 | 0 |
| 18 | 0 0 0 0 | 0 | 1 | 0 | 1 | 0 | 1 | 0 | 1 |
| 20 | 0 1 0 1 | 0 | 1 | 1 | 0 | 0 | 1 | 1 | 0 |
| 22 | 0 0 1 1 | 0 | 1 | 0 | 1 | 1 | 0 | 1 | 0 |
| 24 | 0 1 1 0 | 0 | 1 | 1 | 0 | 1 | 0 | 0 | 1 |

In the operation of the magnetic switch, selection of a core to be driven from the zero state to the one state is accomplished by exciting in each of the selecting pair of windings, the windings which pass through the selected core in the "1" sense, in accordance with the read selection pattern, after which, the write winding, which passes through all of the cores in the "0" sense, is excited to cause previously selected core to be driven from the one state back to the zero state. Thus, assume that all of the cores 10, 12, 14, 16, 18, 20, 22 and 24 are initially in the 0 state and that it is desired to select core 14, corresponding to the read selection pattern 1 1 0 0, to be changed to the 1 state. Consequently, positive signals are applied coincidently to the bases of the transistor drives 28*a*, 30*a*, 32*b* and 34*b* causing them to conduct and apply drive current pulses via windings 38*a*, 40*a*, 42*b* and 44*b*, respectively. Referring to Table III, it will be noted that core 14 is the only core receiving four units of magnetomotive force in the "1" sense. Consequently core 14 will be driven from the 0 state to the 1 state inducing an output pulse, the waveshape of which is shown in FIGURE 3, in the output winding 46*c* which operates as a read drive pulse for the load 48*c*. Referring again to Table III, it will be noted that when drive current pulses are applied to windings 38*a*, 40*a*, 42*b*, and 44*b* to select core 14, cores 10, 12, 16, 18, 20 and 24 each receive two units of magnetomotive force in the "1" sense and two units of magnetomotive force in the "0" sense which cancel each other so that no spurious output pulse is applied to any of the respective output windings 46*a*, 46*b*, 46*e*, 46*f* and 46*h*. However, it will be noted that core 22, having a read selection pattern which is the complement of that for the selected core 14, receives four units of magnetomotive force in the "0" sense. Consequently, core 22 will be driven from the 0 state to point *b* on the hysteresis loop whereby the change in flux $\Delta B_1$ induces a spurious output pulse, the waveshape of which is shown in FIGURE 3, in the output winding 46*g*. This spurious output may be minimized by utilizing magnetic cores having relatively good square loop hysteresis characteristics. If cores having relatively linear hysteresis cycles are employed, this complement output will be large and will differ from the desired output only in polarity.

Following this, a positive signal is next applied to the base of transistor driver 26 causing it to conduct and apply a drive current pulse, via winding 36, which is capable of generating a unit of magnetomotive force, in the "0" sense, equal to the four units of magnetomotive force, in the "1" sense, which was previously generated when the selected core 14 was switched from the 0 state to the one state. Consequently, since the previously selected core 14 is the only core present in the 1 state, this magnetomotive force is effective to switch it from the 1 state back to the 0 state inducing an output pulse, the waveshape of which is equal in magnitude but opposite in polarity to that shown in FIGURE 3, in the output winding 46*c* which may operate as a write drive pulse for the load 48*c*. The remaining cores 10, 12, 16, 18, 20, 22 and 24 all being in the 0 state experience an excursion on the hysteresis loop from point 0 to point *b* inducing negligible spurious outputs therefrom.

Referring again to Table III, it will be noted that half of the cores have a selection pattern which is the complement of the selection pattern of the remaining cores. Thus, cores 10 and 18 having complementary winding patterns, cores 12 and 20 have complementary winding patterns, cores 14 and 22 have complementary winding patterns and cores 16 and 24 have complementary winding patterns. Accordingly, and in a similar manner, any of the other cores 10, 12, 16, 18, 20, 22 and 24 may be selected by applying drive current pulses to the proper windings so that the combined magnetomotive force drives the selected core from one state to the other while one unselected core with a read selection pattern which is the complement of the selected core pattern receives excitation equal to that received by the selected core but in a sense which drives it further into saturation and the remaining cores receive zero excitation. If it is desired to eliminate noise during the selection of a core and a reduction in outputs per driver can be tolerated, then, the complement cores in the magnetic switch of the present invention can be eliminated to provide a magnetic switch of the type described and claimed in application Serial Number 745,395 by this inventor, filed June 30, 1958, and assigned to this assignee wherein only the selected core is excited while all of the remaining cores receive zero excitation. Furthermore, the principles of the present invention can be applied to a matrix type of magnetic switch, similar to that shown in FIGURE 3 of the aforementioned application Serial Number 745,395, by this inventor, wherein a plurality of cores may be arranged in a matrix of rows and columns. A bias wire would be inductively coupled serially through all of the cores to a D.C. power source for biasing all of the cores and as a reset after a read selection. Considering the same number of drivers, then, four pairs of windings would be serially wound through the columns of cores, with the windings being wound in the same pattern through all of the cores in each column but the patterns for the columns corresponding to the selection patterns shown in Table III. Similarly, four pairs of windings would be serially wound through the rows of cores, with the windings being wound in the same pattern through all of the cores in each row but the patterns for the rows corresponding to the selection patterns shown in Table III. Each of the cores of the matrix would have an output winding connected to a load and each pair of column and row windings would be connected to a pair of suitable drivers. In operation, selection of a core to be driven from the zero state to the one state would be accomplished by coincidently exciting in each of the column and row selecting pairs of windings, the windings which pass through the selected core in the "1" sense in accordance with the selected column and row pattern. The core at the intersection of the selected column and row would be the only core to receive full excitation and be switched while the remaining unselected cores except one on the selected column and row would receive half excitation in the "1" sense. All of the cores except one on the column and row having a winding pattern which is the complement of the pattern on the selected column and row would receive half excitation in the "0" sense while the core at the intersection of the complement column and row would receive full excitation but in the "0" sense. The core at the intersection of the selected column and the complement row and the core at the intersection of the complement column and selected row would receive half excitation in both the "1" and "0" sense which would cancel each other to effectively produce zero excitation. All of the remaining cores of matrix would receive zero net excitation also. Thus, by tolerating some negligible spurious outputs, a matrix type of magnetic switch can be provided having four times as many outputs per driver as the magnetic matrix switch of the type in the aforementioned application Serial No. 745,395.

It should be apparent that the magnetic switch of the present invention, regardless of its size, when operated, has one core which provides the desired output, one core which produces a small spurious output and the remaining cores producing zero output. Hence, the present magnetic switch applies the principle of load sharing with a minimum of noise generation and, as a result, economizes on the amount of power required from each driver since the additional power which would normally go into the spurious outputs is reduced.

While the magnetic switch in FIG. 1 has been illustrated with unipolar drivers, it is equally as feasible to use bipolar drivers connected to one winding of each pair, in which case, the complement winding may be eliminated.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A magnetic switch consisting of a plurality of magnetic elements, a plurality of windings coupled to each of said elements in accordance with a predetermined combinatorial code and means for applying current coincidently to selected ones of said windings, said selected windings being wound on one of said elements in such a manner that the magnetic effect generated by the current in said selected windings is effective to produce excitation of said one element, said selected windings being wound on all of the remaining elements of the switch except one in such a manner that the magnetic effect generated by the current in said selected windings is cancelled to produce no excitation of said remaining elements except one.

2. A magnetic switch consisting of a plurality of magnetic cores, a plurality of windings coupled to each of said cores in accordance with a predetermined combinatorial code and means for applying current coincidently to selected ones of said windings, said selected windings being wound on a predetermined one of said cores in such a manner that the magnetic effect generated by the current in said selected windings is effective to produce excitation of said one predetermined core, said selected windings being wound on all of the remaining cores of the switch except one in such a manner that the magnetic effect generated by the current in said selected windings is cancelled to produce no excitation of said remaining cores except one, said selected windings being wound on said one remaining core of the switch in a complementary manner to that on said one predetermined core so that the magnetic effect generated by the current in said selected windings is effective to produce excitation of said one remaining core but in a sense opposite to that in which said one predetermined core is excited.

3. A magnetic switch consisting of a plurality of magnetic elements, a plurality of windings coupled to each of said elements, half of said windings being coupled to each of the elements of the switch in one sense and the other half of said windings being coupled to each of the elements of the switch in an opposite sense in accordance with a predetermined combinatorial code, and means for applying current coincidently to selected ones of said windings which are all coupled to a predetermined one of said elements in said one sense to produce excitation thereof, half of said selected windings being coupled to all of the remaining elements of the switch except one in said one sense and the other half of said selected windings being coupled to all of said remaining elements of the switch except one in said opposite sense to produce no excitation of said remaining elements except one, said selected windings being all coupled to said one remaining element in said opposite sense to produce excitation thereof but in a sense opposite to that in which said one predetermined element is excited.

4. A magnetic switch as in claim 3 including a winding coupled serially to all said plurality of elements in said opposite sense, and means for applying current to said serial winding to produce excitation of said one predetermined element in an opposite sense.

5. A magnetic switch as in claim 3 wherein said elements comprise cores of generally square loop magnetic material.

6. A magnetic switch consisting of a plurality of magnetic cores each having two states of magnetic stability representing a binary 1 and 0, a plurality of windings inductively coupled to each of the cores of the switch, half of said windings being coupled to each of said cores in a 1 sense and the other half of said windings being coupled to each of said cores in a 0 sense in accordance with a predetermined combinatorial code, means for applying current coincidently to selected ones of said windings which are all coupled to a predetermined one of said cores in said 1 sense to produce excitation thereof to switch said one core from the 0 state to the 1 state, half of said first selected windings being coupled to the remaining cores of the switch except one in said 1 sense and the other half of said first selected windings being coupled to said remaining cores except one in said 0 sense to produce no excitation of said remaining cores except one, said selected windings being all wound on said one remaining element in said 0 sense to produce excitation of said one remaining core in said 0 sense.

7. A magnetic switch as in claim 6 including a winding serially wound on said plurality of cores in said 0 sense and means for applying current to said serial winding to produce excitation of said one predetermined core to switch it from the 1 state to the 0 state.

8. A magnetic switch as in claim 7 including a plurality of output windings each associated with a different one of said plurality of cores and having a first output signal induced therein when the associated core switches from the 0 state to the 1 state and a second signal induced therein equal in magnitude but opposite in polarity to that of said first signal when the associated core switches from the 1 state to the 0 state.

9. A 2N output magnetic switch consisting of only 2N magnetic elements, N pairs of input windings coupled to said 2N elements in accordance with a selected pattern developed from a basic four output selection

| | |
|---|---|
| 1 | 1 |
| 1 | 0 |
| 0 | 1 |
| 0 | 0 |

where a row corresponds to a single element and a column corresponds to a pair of windings with a 1 representing the pair coupled to said element in a first and second sense and a 0 representing the pair coupled to said element in a second and first sense, the basic four output selection pattern being expanded in powers of two so that a 2N output selection pattern consists of

| | |
|---|---|
| N output pattern | N output pattern |
| N output pattern | complement of N output pattern |

an N output selection pattern repeated in quadrants I, II and III and complemented in quadrant IV, 2N output windings each coupled to a different one of said 2N elements, and means for applying current coincidently to the winding in each of said pairs of windings which is coupled to one of said elements in said first sense to produce excitation of said one element in said first sense inducing a first output signal in the output winding associated therewith, said selected windings being coupled to the remaining 2N—1 elements in complementary sense to produce no excitation thereof except one of said remaining elements, said selected winding being coupled to said one remaining element in said second sense inducing a second output signal in the output winding associated therewith which is much less in magnitude and opposite in polarity to said first output signal.

10. A magnetic switch consisting of a plurality of magnetic elements, a plurality of coils each of which includes a magnetic coupling with each said element, the sense of the couplings of a selected combination of said coils with a selected one of said magnetic elements being the same whereby effects of current flowing through the coils of said selected combinations aid to magnetically excite said element, the sense of half of the couplings of the coils of said selected combination with each other element except one being opposite to the sense of the other half of the couplings of the coils of said selected combination with each said other element except one whereby the magnetic effects of current flowing through the coils of said selected combination cancel each other to leave said other magnetic element except one unexcited, the sense of the couplings of said coils of said selected combinations with the one remaining element being opposite to the sense of coupling of said coils with the selected element, and output means for each of said magnetic elements.

References Cited in the file of this patent

UNITED STATES PATENTS 2,691,152 Stuart-Williams ---------- Oct. 5, 1954